United States Patent Office 2,769,465
Patented Nov. 6, 1956

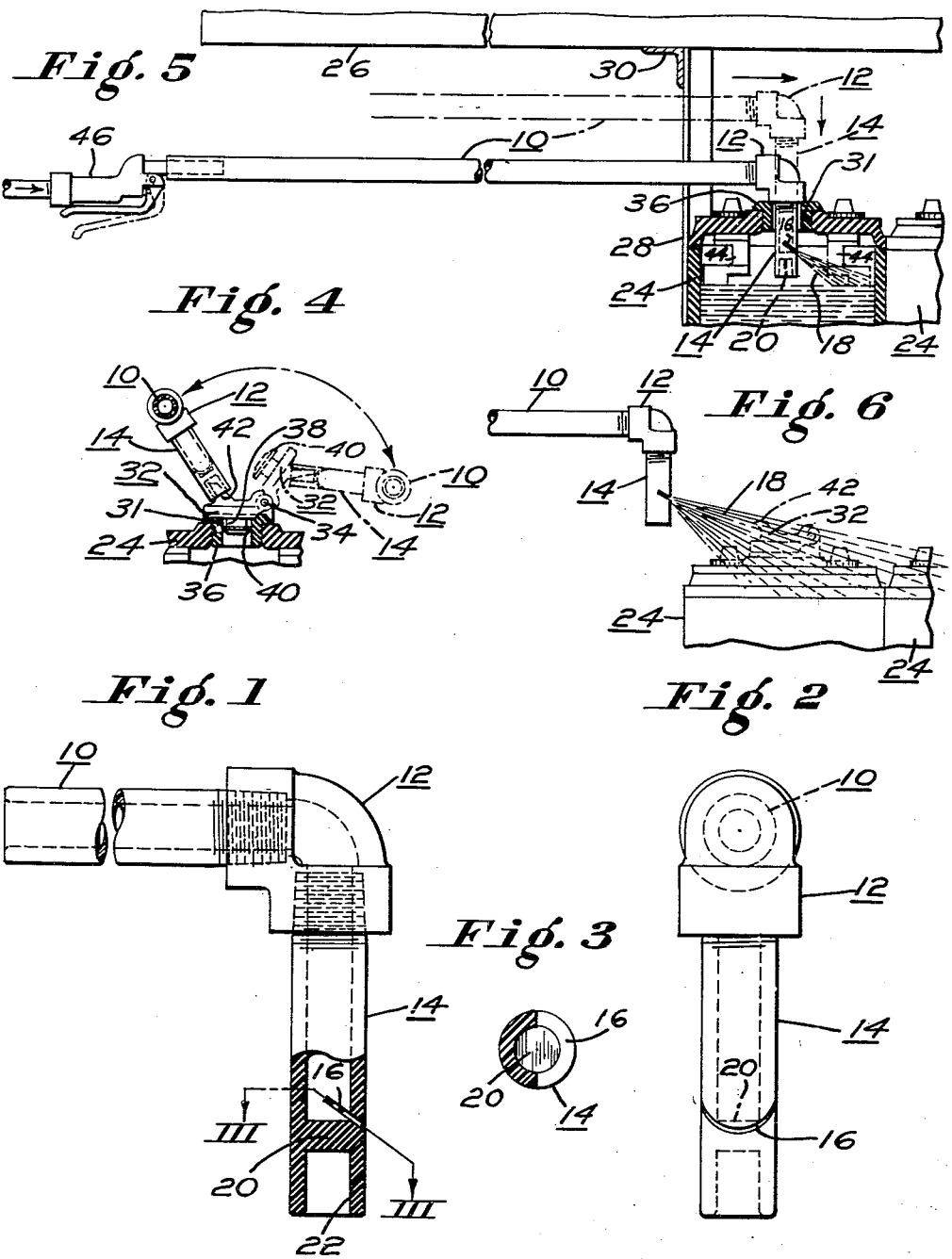

2,769,465

STORAGE BATTERY WATERING DEVICE

Gerald E. Maybach, Bowmansville, N. Y., assignor to Gould-National Batteries, Inc., St. Paul, Minn.

Application November 22, 1954, Serial No. 470,366

5 Claims. (Cl. 141—96)

This invention relates generally to storage battery devices, and more particularly to improvements in fluid filling arrangments therefor.

A particular object of this invention is to provide an improved storage battery filling means whereby batteries such as are contained in storage battery compartments having minimum head room clearances, will be adapted for relatively easy remote controlled filling of the cells of such storage batteries with water, or the like.

Another object of this invention is to provide an improved battery filling means of the remote-controlled type having an automatic warning device indicating completion of a fluid filling operation, thus signalling the operator to stop the battery cell filling operation.

Still another object of this invention is to provide a remote-controlled filling means of the aforesaid type including a spray device for washing off the battery cover after a filling operation.

Still another object of this invention is to provide a filling means of the aforesaid type, which is adapted to cooperate with a horned cover member for the battery filler opening, to facilitate accomplishment of the aforesaid objects and advantages.

Other objects and advantages of the invention will appear from the specification hereinafter.

In the drawing:

Fig. 1 is a fragmentary, partly sectional, view of a filling device of the invention;

Fig. 2 is an end elevational view of the device illustrated in Fig. 1;

Fig. 3 is a sectional view taken on the line III—III of Fig. 1;

Fig. 4 is a view showing application of the device of Fig. 1 to the operation of opening and closing a battery filler opening cover;

Fig. 5 is a view showing the device as being used in a typical remote-controlled battery filling operation; and Fig. 6 is a fragmentary view corresponding to Fig. 5 but showing the device as being used to flush down a localized area of the battery cover.

Referring now to the drawing herein; the particular embodiment of the invention illustrated therein comprises generally an elongated, hollow, filler extension tube 10 which is preferably formed of an electrically nonconductive and battery acid-resistant plastic material. The tube 10 is threaded at one end to carry thereon in threaded relation an elbow member 12 which in turn carries a filler nozzle tube 14 formed of similar plastic material.

The nozzle 14 as illustrated in the drawing comprises a hollow cylindrical nipple which is angularly slotted as indicated at 16 to provide a spray orifice near the end thereof to produce a generally conico-ellipsoidal spray pattern of fluid emitted therefrom as indicated at 18 (Figs. 5 and 6). The nozzle member is internally obstructed by a plug or web 20 while the bottom end of said nozzle is open as indicated at 22 for engagement with the horn of a battery filler opening cover as will be described hereinafter.

The utility of the invention is shown in the drawing at Fig. 5 by way of example in connection with an industrial battery compartment as in a railway car or locomotive. A series of storage battery cells 24 are mounted in the compartment which has a typically low head room ceiling 26; the cells 24 being retained in position by means of vertical supports 28 fixed to the ceiling by transverse angles 30.

The battery cells 24 are each typically provided with a filler opening 31. A cover member 32 is pivotally mounted as at 34 (Fig. 4) to a filler opening bushing 36 which is screw-threaded or otherwise firmly fixed in the opening 31. The cover 32 is formed with a downwardly extending neck 38 which carries a filler opening sealing disc 40. Hence, the cover 32 is adapted to be pivoted between open and closed positions, as indicated by the broken and solid line positions thereof in Fig. 4, and an angularly protruding horn 42 is provided on the cover 32 to facilitate such operations. The open end portion 22 of the nozzle piece of the present invention is shaped and dimensioned so as to readily slip-fit down over the horn 42, whereby the cover may be opened and closed from remotely thereof, as shown in Fig. 4.

The cells 24 are internally constructed as shown in Fig. 5 to have battery terminal post portions 44 laterally of the filler opening 31, and when the nozzle 14 of the filler of the invention is inserted in the opening 31 and the enlarged abutment provided by elbow member 12 is disposed to seat on the bushing member 36, the battery filling water will be sprayed as indicated at 18 (Fig. 5) to hit the terminal post portions 44. Thus, the operation of filling the battery cells will be accompanied by a pronounced hissing noise, but upon filling of a battery cell to the prescribed level the spray 18 will drive into the battery liquid and will cause a pronounced gurgling noise as a result of the turbulence created in the battery liquid. This in turn causes the filling tube 10 to vibrate in the hands of the operator and thus is an automatic signal to the operator at the opposite end of the filler tube. He thereupon cuts off the water supply as by means of a hand grip type shut-off valve as shown at 46.

Thus, it will be understood that whereas in many battery installations it is necessary for battery maintenance personnel to crawl bodily into cramped compartment spaces to perform battery servicing operations, in the case of the present invention the tube 10 is simply thrust into the space above the battery and the end of the filler tube nozzle is first slipped down upon the cover horned portion 42. The filler tube is then rotated by the hand of the operator as indicated in Fig. 4 to open the cover member 32, and then the nozzle portion 14 is inserted into the filler opening 31 until the elbow 12 abuts the filler opening bushing 36 for filling the cell as hereinabove described. Subsequent to filling and re-closing of the cover member by gripping of the cover horn as explained hereinabove, the device is adapted to flush off any spilled acid or the like from the top of the battery as shown in Fig. 6.

It will of course be understood that although only one form of the invention has been shown and described in detail, it will be apparent to those skilled in the art that the invention is not so limited but that various changes may be made therein without departing from the spirit of the invention or the scope of the appended claims.

What is claimed is:

1. The combination with a storage battery having a filler opening and a hinge cover formed with a horn portion, of a watering device comprising an elongated filler tube, a nozzle for insertion into said filler opening, a right angled elbow connecting said tube and said nozzle and engageable with the top of said filler opening when inserted vertically into the latter, said nozzle being provided with a socket portion at its outer end for engagement with the horn portion of said hinged cover to tilt said cover to its open position preliminarily to insertion of said nozzle into said filler opening, and said nozzle being provided in its side wall intermediate the outer end thereof and said elbow with an angularly arranged slot, whereby when said nozzle is inserted into said filler opening water will be directed into the battery so as to cause distinguishable audible signals under battery liquid low-level and high level conditions.

2. The combination with a storage battery having a filler opening and a hinge cover formed with a horn portion, of a watering device comprising an elongated filler tube, a nozzle carried by said tube for insertion into said filler opening, said nozzle and said tube being arranged at substantially right angles to each other, said nozzle being provided with a socket portion at its outer end for engagement with the horn portion of said hinged cover to manually tilt said cover to its open position about an axis parallel with the axis of said tube, and said nozzle being provided in its side wall intermediate the outer end thereof and said elbow with a downwardly inclined slot, whereby when said nozzle is inserted into said filler opening water will be directed into the battery so as to cause distinguishable audible signals under battery liquid low-level and high-level conditions.

3. The combination with a storage battery having a filler opening and a hinge cover formed with a horn portion, of a watering device comprising an elongated filler tube, a nozzle carried by said tube for insertion into said filler opening, said nozzle and said tube being arranged at substantially right angles to each other, said nozzle being provided with a lateral web extending across the opening near its outer end thereby forming an outwardly-facing socket for engagement with the horn portion of said hinged cover to manually tilt said cover to its open position about an axis parallel with the axis of said tube, and said nozzle being provided in its side wall adjacent said web with a downwardly inclined slot, whereby the water will be directed into the battery so as to cause distinguishable audible signals under battery liquid low-level and high-level conditions.

4. The combination with a storage battery having a filler opening and a hinge cover formed with a horn portion, of a watering device comprising an elongated filler tube, a nozzle for insertion into said filler opening, a right angled elbow connecting said tube and said nozzle and engageable with the top of said filler opening when inserted vertically into the latter, said nozzle being provided with a lateral web extending across the opening thereof near its lower end thereby forming an outwardly facing socket for engagement with the horn portion of said hinged cover to manually tilt said cover to its open position about an axis parallel with the axis of said tube, and said nozzle being provided in its side wall adjacent said web with a downwardly inclined slot, whereby the water will be directed into the battery so as to cause distinguishable audible signals under battery liquid low-level and high-level conditions.

5. A watering device for a storage battery having a filler opening and a hinged cover therefor formed with a horn portion, said watering device comprising a filler tube, a nozzle carried by said tube for insertion into the battery filler opening, said nozzle and said tube being arranged at substantially a right angle to each other, means providing an enlarged abutment adjacent the juncture of said nozzle with said tube for engaging the battery adjacent the filler opening when said nozzle is inserted therein, and means providing a socket portion at the outer end of said nozzle for engagement with the cover horn portion to tilt the cover to open position, said nozzle being provided with an angularly arranged slot in its side wall intermediate the opposite ends thereof, whereby said device will direct water into the battery so as to cause distinguishable audible signals under battery liquid low-level and high-level conditions.

References Cited in the file of this patent

UNITED STATES PATENTS

| Number | Name | Date |
|---|---|---|
| 987,518 | Wendling | Mar. 21, 1911 |
| 1,318,810 | Shepherd | Oct. 14, 1919 |
| 1,882,154 | Mann et al. | Oct. 11, 1932 |
| 2,103,055 | Bickley | Dec. 21, 1937 |
| 2,244,947 | Hargiss | June 10, 1941 |
| 2,647,014 | Edwards | July 28, 1953 |